Patented Sept. 16, 1941

2,256,160

UNITED STATES PATENT OFFICE 2,256,160

MAKING POLYMERIZED VINYL AROMATIC ARTICLES

Edgar C. Britton and Walter J. Le Fevre, Midland, Mich., assignors to The Dow Chemical Company, Midland, Mich., a corporation of Michigan No Drawing. Application November 18, 1938, Serial No. 241,161

6 Claims. (Cl. 173—244)

This invention concerns an improved method of polymerizing a vinyl aromatic compound to produce solid resinous articles of desired shape and size. It particularly concerns an improved method of insulating joints, terminals or other parts of electric cables or wires with polystyrene or other resinous vinyl-aromatic polymers.

It is well known that polystyrene possesses unusual dielectric properties which render it an exceptionally effective electric insulating agent and it has heretofore been employed as an insulating agent for the joints and terminals of electric cables. However, the known methods for forming such polystyrene insulation on a cable part are far from convenient and are not at all well adapted to field work, i. e. to application outside a factory. One known method is to place the cable part inside a mold of the type used in injection molding and then to inject polystyrene, heated to a plastifying temperature, into the mold wherein it surrounds the cable part, and on cooling forms a solid coating over the same. This method of applying pre-polymerized styrene to the cable requires the use of an injection molding machine operated by a skilled workman and obviously is not well adapted to use outside a factory.

The other known method of applying polystyrene to a cable part involves placing the part to be insulated inside of a water tight mold of suitable size and shape, filling the mold with liquid styrene so that the latter surrounds the cable part and then applying heat until the styrene is polymerized to a solid. From 2 to 3 days of heating at temperatures between 80° and 200° C. are usually required to complete the polymerization. This method possesses a number of inherent disadvantages. It is not well suited to field work both because of the time required for the polymerization and because of the inconvenience of handling and polymerizing liquid styrene under conditions where a part to be insulated will often be difficultly accessible and different parts to be insulated may vary sufficiently from one another in size or shape to require the employment of separate molds. An even more serious disadvantage resides in the fact that styrene shrinks very markedly during polymerization and also to a lesser extent during cooling of the polymer, and due to such shrinkage, the polystyrene insulation may not adhere tightly to the cable and may develop cracks or other flaws so that the method does not assure production of a flawless insulation.

An object of this invention is to provide a simple method for making a resinous polymerized vinyl-aromatic article of desired size and shape, particularly a polystyrene coating or cap on a part of an electric cable or wire, which method avoids the great shrinkage which occurs when liquid styrene is polymerized in a mold, and which method, due to its simplicity, is well adapted to use by linemen or other electricians in insulating parts of wires, cables or other electric equipment in the field. Other objects will be apparent from the following description of the invention.

In our research on the polymerization of styrene, we have discovered that the considerable shrinkage which is known to take place when styrene is polymerized occurs almost entirely in the early stages of the polymerization and that after about 85 per cent of the styrene has been polymerized, little if any shrinkage takes place during completion of the polymerization. In fact, most of the shrinkage occurs during the first half of a polymerization and the small amount of shrinkage occurring during the last half of a polymerization is usually not in itself sufficient to cause serious defects in the final polymerized article. We have found in the production of a shaped polystyrene article by polymerization of liquid styrene in a mold that it is the shrinkage occurring during the first half of the polymerization, which is principally accountable for the faults which so often occur in articles made in such manner, and that the shrinkage occurring in the last half of the polymerization is, in itself, too slight to cause pronounced defects.

We have further found that styrene which is from 50 to 85 per cent polymerized may be rendered soft and plastic by mild warming and when in this plastic condition may be spread or kneaded over a cable joint or terminal or may be charged into a mold, after which the polymerization may be completed without occurrence of appreciable shrinkage.

We have still further found that in preparing a shaped polystyrene article from liquid styrene, the liquid may rapidly be polymerized to the point at which the mass contains only from 15 to 50 per cent of monomeric styrene, by heating at temperatures between 100° and 200° C. in any suitable equipment, after which the partially polymerized material, which has already undergone most of the shrinkage which will take place due to polymerization, may be shaped in a mold or otherwise. The polymerization may then advantageously be completed at a temperature below 100° C., e. g. at 70°–100° C. By operating in this particular manner, the shrinkage is largely confined to the initial rapid stage of the polymerization and after shaping the partially polymerized mass, little further shrinkage occurs either due to completion of the polymerization or to cooling of the polymer.

In insulating joints, terminals, or other parts of electric cables, wires, or other conductors, a stock of partially polymerized styrene to be used in the insulating operations is first prepared. This stock is made by polymerizing styrene to the point at which from 50 to 85 per cent of the compound has undergone polymerization. This initial polymerization is usually carried out rapidly by heating the styrene in an open or closed container at temperatures between 100° and 200° C., preferably between 100° and 140° C., but it may be carried out more slowly at lower temperatures, if desired. The stock of partially polymerized styrene may, of course, also be prepared by mixing styrene with polystyrene to form a mass containing from 50 to 85 per cent of the polymer, but this is usually not as convenient as is preparation of the stock by partial polymerization.

The stock of partially polymerized styrene varies from a soft plastic resin readily moldable at room temperature to a harder resin which must be warmed, in some instances to 80°–100° C., in order to render it plastic, depending on the extent of polymerization. This stock of partially polymerized styrene is preferably used as such for the subsequent insulation of electrical equipment, but it may, if desired, have incorporated therewith other agents such as dibutyl phthalate, pentachloro-diphenyloxide, hexa-chorol-diphenyl, rubber, gutta percha, etc. for purpose of modifying the mechanical, adhesive, or dielectric properties of the final insulation.

The partially polymerized styrene mixture may be applied without difficulty to the electric equipment to be insulated. In the insulation of connections between wires or cables, a lineman will ordinarily warm the mixtures, if necessary, to render it plastic, coat the part to be insulated with the plastic mass, and then wrap the coating with tape or the like. This final wrapping may sometimes be omitted. The partially polymerized mass is a soft, but excellent electric insulating agent and on standing it becomes harder due to further polymerization. No appreciable shrinkage occurs after the insulating material is applied to the equipment.

When a fairly hard insulation is desired, a mold capable of withstanding heat is placed over the part to be insulated and the partially polymerized styrene is charged into the mold. The mold is then heated, preferably at a temparature of 80°–100° C., until the polymerization is substantially complete, after which the mold is removed. This final polymerization requires only a few hours, e. g. 4–10 hours, of heating and causes little if any shrinkage of the insulating material; nor does appreciable shrinkage occur on cooling the polymer from the preferred polymerizing temperature of 80°–100° C. to room temperature.

The invention has been described above as applied to the formation of polystyrene insulating coatings on the parts of electrical equipment, but it is not limited thereto. Our step-wise method of partially polymerizing styrene, molding the partial polymer, and then completing the polymerization may also advantageously be applied in making other flawless articles of polystyrene, e. g. optical lenses, toilet articles, etc. Also, in place of styrene other vinyl aromatic compounds such as para-chloro-styrene, (para-methyl-styrene, meta-ethyl-styrene, divinyl benzene, etc., or mixtures of such vinyl aromatic compounds with modifying agents such as diallyl maleate, triallyl phosphate, etc., may advantageously be polymerized in accordance with the invention to form insulation coatings on wires, cables, etc., or to form other articles such as those mentioned above.

The following examples present the experimental data serving as basis for the invention and illustrate the advantages of the invention, but they are not to be construed as limiting the invention.

*Example 1*

Substantially pure styrene of specific gravity 0.903 at 25° C. with respect to water at the same temperature was polymerized by heating at a temperature of 140° C. for 3 days, after which the resinous product was dissolved in benzene and the polymer was precipitated by mixing the solution with alcohol. The precipitate was separated, dried under vacuum and its gravity was determined. It had a specific gravity of 1.053 at 25°/25° C. Accordingly, there was a 14.2 per cent reduction in volume during conversion of the styrene into its polymer. Similar experiments wherein the polymerization was carried out at other temperatures showed that there was approximately the same, i. e. about 14 per cent, reduction in volume during complete conversion of styrene into its polymers.

*Example 2*

Several samples of styrene of specific gravity 0.903 at 25°/25° C. were polymerized at a temperature of 125° C. until the polymerization of each sample had been carried to the point indicated under the caption "First stage of polymerization" in the following table. The specific gravity of each sample was then measured and the per cent shrinkage, based on the initial volume of each styrene sample, was calculated. The per cent shrinkage on the same basis which takes place when the polymerization of each partially polymerized sample is completed to produce a polymer having the specific gravity of 1.053, indicated in Example 1, was also calculated. The following table gives the percent of the styrene polymerized in the first stage of the polymerization, the specific gravity at 25° C. with respect to water at the same temperature of each partially polymerized sample, and the shrinkage, i. e. per cent reduction in volume based on the original volume of the styrene, that occurred during this first stage in the polymerization of each sample. The table also gives the shrinkage, on the same basis, which occurs when the polymerization of each sample is then carried to completion. It will be noted that the shrinkage which occurs during the second stage, i. e. during completion of each polymerization, represents only a small fraction of the total shrinkage due to polymerization.

Table

| Sample No. | First stage of polymerization ||| Shrinkage during second stage of polymerization |
|---|---|---|---|---|
| | Styrene polymerized | Sp. gr. | Shrinkage | |
| | *Percent* | | *Percent* | *Percent* |
| 1 | 50 | 0.986 | 8.4 | 5.8 |
| 2 | 60 | 1.004 | 10.1 | 4.1 |
| 3 | 65 | 1.013 | 10.8 | 3.4 |
| 4 | 70 | 1.022 | 11.6 | 2.6 |
| 5 | 75 | 1.032 | 12.5 | 1.7 |
| 6 | 80 | 1.040 | 13.2 | 1.0 |
| 7 | 85 | 1.052 | 14.2 | 0.0 |

Example 3

The purpose of this example is to demonstrate the advantage of polymerizing styrene to make a shaped article in accordance with this invention, rather than by merely filling a mold with liquid styrene, heating until the polymerization is complete and cooling and removing the polymerized article as taught in the prior art. In polymerizing styrene in a mold at a temperature of 160° C. until the polymerization is substantially complete, there occurs a 14.2 per cent reduction in volume of the material, and on thereafter cooling the mold from 160° C. to room temperature, thermal contraction of the polymer also takes place so that the over-all shrinkage of the material within the mold corresponds to about 20 per cent of the volume of styrene initially used. In contrast, when styrene is partially polymerized, according to this invention, by heating at 160° C. until the polymerization is 63 per cent complete, and the partially polymerized material is cooled to 100° C., charged into a mold and the polymerization is completed by maintaining the mold at a temperature of 100° C., the shrinkage occurring during this final polymerization in the mold represents only 3.6 per cent of the volume of the material charged into the mold. The thermal contraction which occurs during cooling of the product from the final polymerizing temperature, i. e. 100° C., to room temperature is small, not more than 2.5 per cent of the volume of the material charged into the mold.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method of polymerizing a vinyl aromatic compound to produce an article of desired shape which comprises polymerizing the compound at a temperature above 100° C. until the polymerization is from 50–85 per cent complete, to obtain a product which is sufficiently plastic to permit shaping of the same at temperatures not greatly higher than 100° C. and is sufficiently solid to retain its shape at room temperature, shaping the partially polymerized material and completing the polymerization.

2. The method of polymerizing styrene to produce an article of desired shape which comprises polymerizing the styrene at a temperature above 100° C. until the polymerization is from 50–85 per cent complete, to obtain a product which is sufficiently plastic to permit shaping of the same at temperatures not greatly higher than 100° C. and is sufficiently solid to retain its shape at room temperature, charging the partially polymerized styrene into a mold and completing the polymerization at a temperature not exceeding 100° C.

3. The method of insulating electrical equipment which comprises applying and shaping onto the surface of the equipment a plastic coating of a mixture of a vinyl aromatic compound and its polymer containing from 50 to 85 per cent of the polymer, and thereafter further polymerizing the vinyl aromatic compound while in contact with the electrical device.

4. The method of insulating electrical equipment which comprises applying and shaping onto the surface of the equipment a plastic coating of a mixture of styrene and its polymer containing from 50 to 85 per cent of the polymer, and thereafter further polymerizing the styrene while in contact with the electrical device.

5. The method of insulating an electric cable part which comprises applying and shaping onto the cable part a plastic coating of partially polymerized styrene containing from 50 to 85 per cent of polymerized styrene and thereafter further polymerizing the styrene.

6. The method of insulating an electric cable joint which comprises applying and shaping onto the surface of the cable joint a plastic coating of partially polymerized styrene containing from 50 to 85 per cent of polymerized styrene and wrapping the coating with tape.

EDGAR C. BRITTON.
WALTER J. LE FEVRE.